(No Model.)

A. E. HOLADAY.
BICYCLE SUPPORT.

No. 576,071. Patented Jan. 26, 1897.

Witnesses:
Frank P. Prindle.
Henry C. Hazard.

Inventor.
Albert E. Holaday
by Prindle and Russell
his attorneys

UNITED STATES PATENT OFFICE.

ALBERT E. HOLADAY, OF NEW HAVEN, CONNECTICUT, ASSIGNOR OF ONE-HALF TO HOBART B. IVES, OF SAME PLACE.

BICYCLE-SUPPORT.

SPECIFICATION forming part of Letters Patent No. 576,071, dated January 26, 1897.

Application filed January 7, 1896. Serial No. 574,582. (No model.)

*To all whom it may concern:*

Be it known that I, ALBERT E. HOLADAY, of New Haven, in the county of New Haven, and in the State of Connecticut, have invented certain new and useful Improvements in Bicycle-Supports; and I do hereby declare that the following is a full, clear, and exact description thereof, reference being had to the accompanying drawings, in which—

Figure 1:
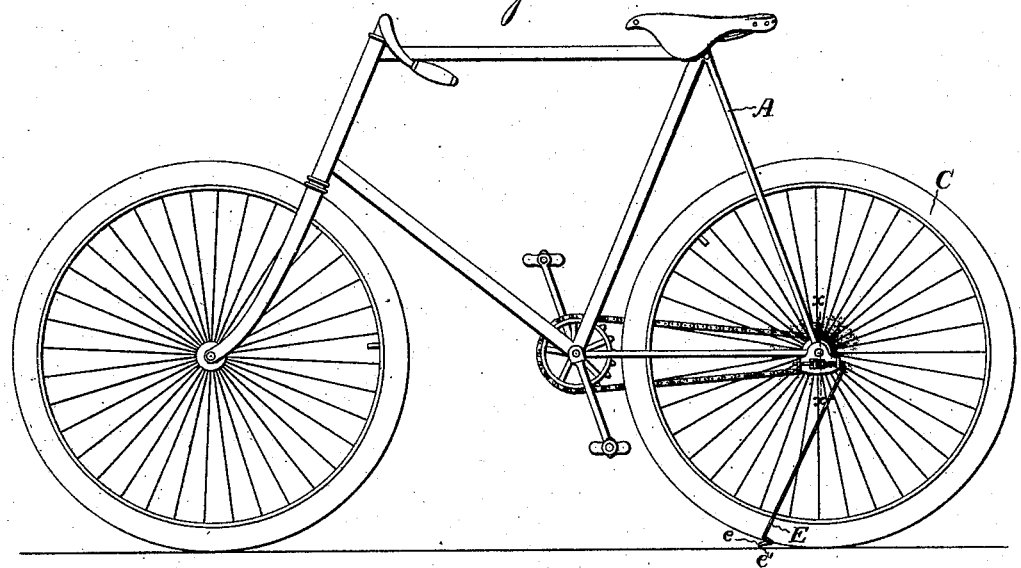
Figure 2:
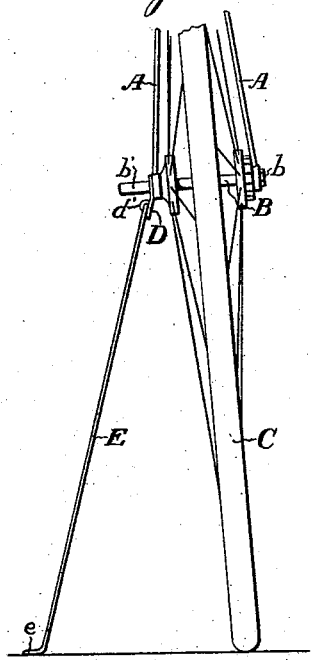
Figure 4:
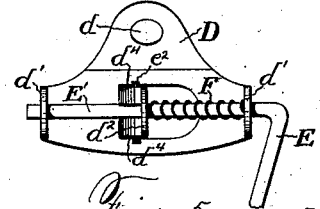
Figure 3:
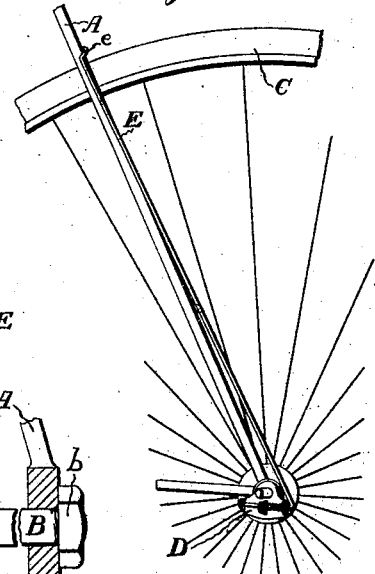

Figure 1 shows a view in side elevation of a bicycle provided with my improved support; Fig. 2, a rear elevation of the rear portion of the machine with the support attached and in operative position; Fig. 3, a detail perspective view, on an enlarged scale, showing the support swung up into its inoperative position; Fig. 4, a detail view, on an enlarged scale, showing the attaching-head and portion of the rod in side elevation; and Fig. 5, a view of a section of the attaching-head on line $xx$ of Fig. 1, the parts being shown on a more enlarged scale.

Letters of like name and kind refer to like parts in each of the figures.

The object of my invention is to provide an improved support for supporting bicycles in a standing position when they are not in use; and to this end my invention consists in the support, the construction, arrangement, and combination of the parts thereof, and in the combination of the support with a bicycle, as hereinafter specified.

My invention relates particularly to that class of supports in which the supporting arm or rod is pivotally connected with the bicycle-frame so as to be capable of being swung up out of the way when the machine is being used and turned down into position to act as a supporting-brace to engage the ground, floor, or other surface upon which the machine rests when the latter is standing still and not in use.

In the drawings, showing a bicycle with my support attached, A designates one of the branches of the bicycle-frame, which run down to and are connected with the rear fixed shaft B on opposite sides of the wheel C. As usual, such branches extend at an angle upward and forward from the point of their connection with shaft B, as shown in the drawings. They are usually held in place on the shaft B by nuts $b\ b$, as shown in full lines in Fig. 5, or by a nut on one end of the shaft and a step $b'$ (shown in dotted lines) screwed on the other end and adapted to act as a nut.

My improved support has an attaching-head D, provided with a hole $d$ to admit the passage of the shaft B where it projects beyond the outer side of the frame branch A. Such head is preferably in the form of a plate, as shown, having the part containing the hole $d$ upright, so as to rest squarely against the outer side of the frame branch and being, below such part bent outward and downward at an angle, as shown best in Fig. 4. Upon this inclined portion of the head are the two ears $d'\ d'$, in which is journaled the pivotal horizontal part of rod E. The main part or body of this rod is bent at less than a right angle to the described pivotal portion, in order that when the rod is swung up out of operative position, as shown in Fig. 3, it may stand with its end pressed against the upwardly and forwardly inclined frame branch A, and that when the rod is swung down into operative position its end may be adapted to engage the ground or floor upon which the bicycle may be resting at a point in or nearly in the same vertical plane with the shaft B.

The rod near its outer end is bent so as to form a foot $e$, adapted to prevent the rod from sinking into the ground, while the extreme end of the rod is bent down and sharpened to form a spur $e'$, which will effectually prevent slipping of the support on any surface. The foot $e$ is formed by bending the rod to form it into a portion of a circle, the under side of such portion being inclined to the rod, so as to sit squarely upon the ground when the support is down and the spur $e'$ has entered the ground, as shown in Fig. 2.

Upon the plate forming the attaching-head D is a lug $d^2$, situated between the ears $d'\ d'$ and having an opening $d^3$, through which the pivotal part E' of the rod E passes. This lug has the two shoulders $d^4\ d^4$ on opposite sides of its opening $d^3$ in position to be engaged by the pin $e^2$, passing through and projecting beyond the sides of the part E' of the rod.

A helical spring F, surrounding the rod and bearing at one end against the pin $e^2$ and at the other against the inner side of one of the ears $d'\ d'$, serves to keep the pivotal part of the rod forced in a direction to bring the pin $e^2$ against the lug $d^2$ in such position that the swinging of the rod will be limited by the engagement of the pin with the shoulders $d^4\ d^4$ on the lug.

The pivotal part of the rod is of such length that it is capable of being moved longitudinally through the pivotal ears $d'\ d'$ far enough to take the pin $e^2$ away from the lug $d^2$, so that the pin $e^2$ will not engage either shoulder $d^4$ as the rod is swung up or down. For this purpose the pivotal part of the rod must be moved over against the stress of spring F, which when the power so moving the rod is removed will at once move the pivotal part of the rod longitudinally inward to bring its pin $e^2$ against lug $d^2$ in position to engage one of the shoulders $d^4\ d^4$ should it be attempted to swing the rod up or down.

While I have shown and described the pivotal part of the rod as provided with a pin projecting beyond its opposite sides, I do not limit myself to such construction. It would be sufficient and entirely within the scope of my invention if a pin should be used which projected beyond only one side of the rod, or if in place of the separate pin the projection or projections to engage the shoulders $d^4\ d^4$ and to be engaged by the spring F should be made on or integral with the rod.

Figure 5:
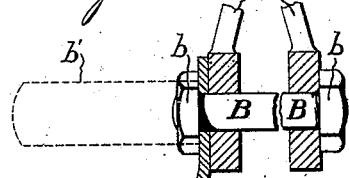

The head D when placed upon the projecting end of the shaft B, as hereinbefore described, is to be firmly clamped against the outer side of part of frame branch A, which surrounds such shaft, either by one of the nuts $b$ or by the step $b'$ being screwed upon the shaft, as indicated in Fig. 5.

The operation and manner of using my improved support, which will be understood from the foregoing description, are, briefly, as follows: With the head D clamped in place, as just described, if the rod E, forming the body of the support, be swung up into the position which it has in Fig. 3 the semicircular bend which forms the foot $e$ will engage the frame branch A so as to keep the support from swinging outward. The action of the spring F upon the pivotal part E' of the rod pressing such part longitudinally inward, as it does, causes the foot $e$ to be pressed into firm engagement with the frame branch A. The support will then be securely held from any outward and downward swinging and from any shaking or rattling as the bicycle is being used.

If desired, I contemplate bending the body of the rod E at such an angle to the pivotal part E' that it will have to be sprung a little to allow the foot $e$ to be snapped into engagement with the frame branch.

When the support is to be brought into operation, the foot $e$ is disengaged from the frame branch and the pivotal part E' of the rod E is drawn out to take the pin $e^2$ away from lug $d^2$ far enough to clear it from the upper shoulder $d^4$. The rod is then swung down until the pin $e^2$ passes beyond the lower shoulder $d^4$, when the spring F will quickly move the pivotal part of the rod longitudinally inward, to bring the pin against the lug $d^4$, below the lower shoulder thereon, which latter will then act as a stop to engage the pin and limit the outward swing of the rod E. Such rod, being swung out until the pin engages the stop-shoulder, is in position to act as a supporting-brace for holding the machine in a standing position, as shown in Figs. 1 and 2. If the machine is resting on a hard surface, the spur $e'$ will engage the latter, while if the machine is on the ground or any other yielding surface the spur $e'$ will stick into the surface, so that the foot $e$ can rest firmly upon the latter.

When the bicycle is to be used again, the rod E can, when its pivotal portion E' has been drawn out against the stress of spring F to clear the pin $e^2$ from the lower stop-shoulder $d^4$, be swung upward to bring its foot $e$ into engagement with the frame branch A again, so that the rod will be retained in its inoperative position, in the manner described hereinbefore and indicated in Fig. 3.

My support, constructed and arranged in combination with a bicycle, as shown and described, is most simple and cheap in construction, is capable of being quickly moved from inoperative into operative position when it is to be used to support the machine, is when so moved well adapted to securely support the machine in a standing position on any surface, and is arranged to be held firmly without any possibility of vibration or rattling during use of the bicycle when it has been swung up into its inoperative position.

My support consists of a very few parts, and they are such as can be most cheaply made and put together.

The head D can be made from one piece of metal plate cut or stamped and struck up to form the ears $d'\ d'$ and lug $d^2$ with its shoulders $d^4\ d^4$.

Having thus described my invention, what I claim is—

1. In a support for bicycles, in combination with an attaching-head having a portion provided with a stop-shoulder, a rod having a pivot provided with a projecting stop, and journaled in the head, so as to be capable of being rocked and moved longitudinally, and a spring tending to move the pivot longitudinally, to bring the projecting stop upon it into position to engage the stop-shoulder, substantially as and for the purpose specified.

2. In a support for bicycles, in combination with an attaching-head provided with ears, and a lug having a stop-shoulder, a rod having a rocking and longitudinally-movable pivot, journaled in the ears, and provided with a projecting stop, and a spring tending to move the rod-pivot, to carry the stop thereon toward the shouldered lug, substantially as and for the purpose shown.

3. In a support for bicycles, in combination with an attaching-head, provided with ears and with a lug having two stop-shoulders, a rod having a rocking and longitudinally-movable pivot journaled in the ears, and provided with a projecting stop, and a spring tending to move the rod-pivot, to carry the stop thereon toward the shouldered lug, substantially as and for the purpose set forth.

4. In a support for bicycles, in combination with an attaching-head provided with ears, and a lug having two stop-shoulders, a rod, having a portion bent at an angle to the body of the rod, and journaled in the ears on the attaching-head, a pin projecting on opposite sides of such rod, and a spring tending to move the pivotal portion of the rod, to carry the pin toward the shouldered lug on the head, substantially as and for the purpose described.

5. In a bicycle-support, in combination with an attaching-head provided with ears and a shouldered lug, a rod having a pivotal portion bent at an angle to the rest of the rod, journaled in the ears on the attaching-head, and provided with a projecting stop, and a spring tending to move the pivotal portion of the rod longitudinally, to carry the stop on the rod toward the shouldered lug, substantially as and for the purpose specified.

6. In a bicycle-support, in combination with an attaching-head, provided with ears and with a shouldered lug, a rod having a pivotal portion bent at an angle to the rest of the rod, journaled in the ears on the attaching-head, a pin passing through the pivotal portion of the rod, and a spring on such portion between the pin, and one of the ears on the attaching-head, substantially as and for the purpose shown.

7. In combination with a bicycle, a support consisting of an attaching-head secured to the bicycle, provided with ears and a shouldered lug, a rod, having a curved portion to engage one of the branches of the bicycle-frame, and a pivotal portion journaled in the ears on the attaching-head, and capable of longitudinal movement through such ears, a stop on such pivotal portion, and a spring to move such portion, to carry the stop toward the shouldered lug, substantially as and for the purpose described.

8. In combination with a bicycle, a support having an attaching-head secured to the bicycle, provided with the ears and the shouldered lug, a rod having a portion bent to form a foot, and to engage a branch of the bicycle-frame, when the rod is swung up out of its bicycle-supporting position, and a pivoted portion bent at an angle to the rest of the rod, journaled in the ears of the attaching-head, so as to be longitudinally movable therein, and provided with a projecting stop, and a spring tending to move the pivotal portion of the rod longitudinally to carry its projecting stop toward the shoulders on the head, substantially as and for the purpose specified.

In testimony that I claim the foregoing I have hereunto set my hand this 7th day of December, A. D. 1895.

ALBERT E. HOLADAY. [L. S.]

Witnesses:
CHAS. G. KEELER,
CHARLES A. BRAY.